US012688199B2

(12) United States Patent
Yang et al.

(10) Patent No.: US 12,688,199 B2
(45) Date of Patent: Jul. 21, 2026

(54) METHODS FOR CONFIGURING NODES IN DISTRIBUTED DATABASE, METHODS FOR SYNCHRONIZING TRANSACTION LOGS IN THE DISTRIBUTED DATABASE, AND NODES IN DISTRIBUTED DATABASE

(71) Applicant: Beijing OceanBase Technology Co., Ltd., Beijing (CN)

(72) Inventors: Zhenkun Yang, Beijing (CN); Fusheng Han, Beijing (CN); Chuanhui Yang, Beijing (CN); Junquan Chen, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/954,753

(22) Filed: Nov. 21, 2024

(65) Prior Publication Data

US 2025/0086199 A1     Mar. 13, 2025

Related U.S. Application Data

(63) Continuation of application No. PCT/CN2023/087009, filed on Apr. 7, 2023.

(30) Foreign Application Priority Data

Jun. 24, 2022    (CN) ......................... 202210724274.X

(51) Int. Cl.
G06F 16/27        (2019.01)
G06F 16/21        (2019.01)
(52) U.S. Cl.
CPC ............ G06F 16/27 (2019.01); G06F 16/217 (2019.01)

(58) Field of Classification Search
CPC ............................... G06F 16/27; G06F 16/217
(Continued)

(56) References Cited

U.S. PATENT DOCUMENTS 7,617,369 B1    11/2009  Bezbaruah et al.
9,984,140 B1 *   5/2018  Sukumaran ............. G06F 16/27
(Continued)

FOREIGN PATENT DOCUMENTS

CN            104679796 A      6/2015
CN            106991113 A      7/2017
(Continued)

OTHER PUBLICATIONS

International Preliminary Report on Patentability in International Appln. No. PCT/CN2023/087009, mailed on Jan. 2, 2025, 12 pages (with English translation).
(Continued)

*Primary Examiner* — Ajay M Bhatia
*Assistant Examiner* — Lauren Zannah Ganger
(74) *Attorney, Agent, or Firm* — Fish & Richardson P.C.

(57)        ABSTRACT

Embodiments of this specification provide methods for configuring nodes in a distributed database, methods for synchronizing transaction logs in the distributed database, and the nodes in the distributed database. One method for configuring nodes includes: determining a first quantity of first nodes from N nodes in the distributed database, wherein the first nodes comprise a master node configured to synchronize transactions, the first quantity is an integer greater than N/2, and the first nodes determine a first transaction based on a distributed consistency protocol, and determining one or more of remaining nodes other than the first nodes in the N nodes as asynchronous nodes or election nodes, wherein the asynchronous nodes are configured to asynchronously receive the first transaction from the master node, and
(Continued)

the election nodes are configured to modify at least the master node.

20 Claims, 6 Drawing Sheets

(58) Field of Classification Search
USPC ........................................................ 707/610
See application file for complete search history.

(56) References Cited

U.S. PATENT DOCUMENTS

| | | | | |
|---|---|---|---|---|
| 2013/0290249 A1* | 10/2013 | Merriman | ............. | G06F 16/278 |
| | | | | 707/610 |
| 2021/0209131 A1* | 7/2021 | Wang | .................... | H04L 63/126 |
| 2022/0109723 A1 | 4/2022 | Mamadapur et al. | | |
| 2024/0256572 A1* | 8/2024 | Toste Gomes | ........ | G06F 16/278 |

FOREIGN PATENT DOCUMENTS

| | | |
|---|---|---|
| CN | 108090222 A | 5/2018 |
| CN | 109819003 A | 5/2019 |
| CN | 110502460 A | 11/2019 |
| CN | 110691062 A | 1/2020 |
| CN | 112015744 A | 12/2020 |
| CN | 112860393 A | 5/2021 |
| CN | 112865995 A | 5/2021 |
| CN | 113535656 A | 10/2021 |
| CN | 114237497 A | 3/2022 |
| CN | 114461438 A | 5/2022 |
| CN | 115185961 A | 10/2022 |
| WO | 2021052237 A1 | 3/2021 |

OTHER PUBLICATIONS

International Search Report and Written Opinion in International Appln. No. PCT/CN2023/087009, mailed on Jun. 23, 2023, 16 pages (with English translation).
Lykhenko et al., "FaaSTCC: Efficient Transactional Causal Consistency for Serverless Computing," Paper, Presented at the Middleware '21: 22nd International Middleware Conference, Québec, Canada, Dec. 6-10, 2021; Middleware '21: Proceedings of the 22nd International Middleware Conference, ACM, Dec. 2, 2021, pp. 159-171.
Zhao et al., "Consensus-based distributed fusion estimatior with energy and bandwidth constraints," Control and Decision, Jan. 2020, 35(1):16-24 (with English Abstract).

* cited by examiner

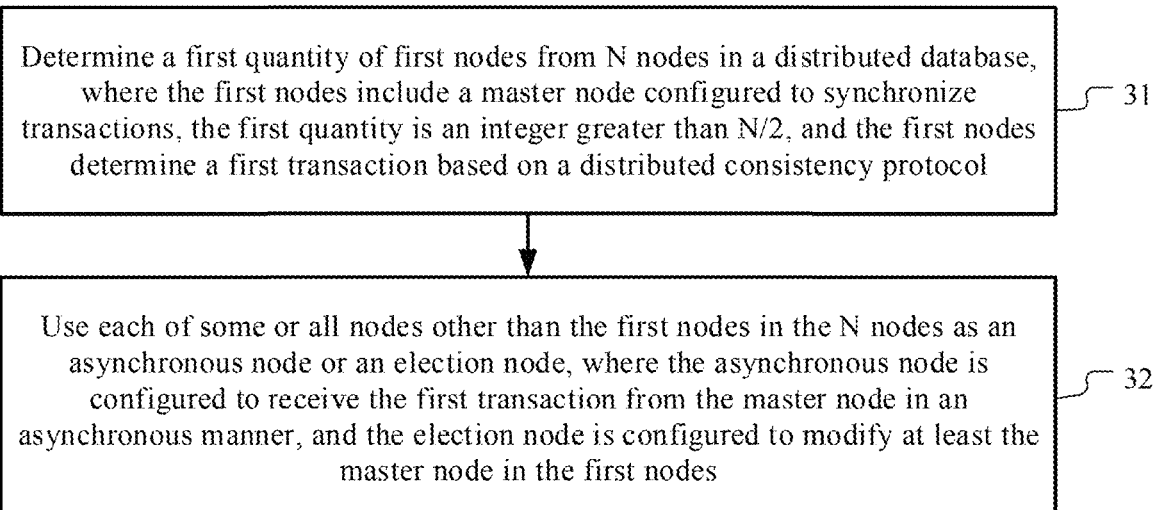

Determine a first quantity of first nodes from N nodes in a distributed database, where the first nodes include a master node configured to synchronize transactions, the first quantity is an integer greater than N/2, and the first nodes determine a first transaction based on a distributed consistency protocol ⌐ 31

Use each of some or all nodes other than the first nodes in the N nodes as an asynchronous node or an election node, where the asynchronous node is configured to receive the first transaction from the master node in an asynchronous manner, and the election node is configured to modify at least the master node in the first nodes ⌐ 32

FIG. 3

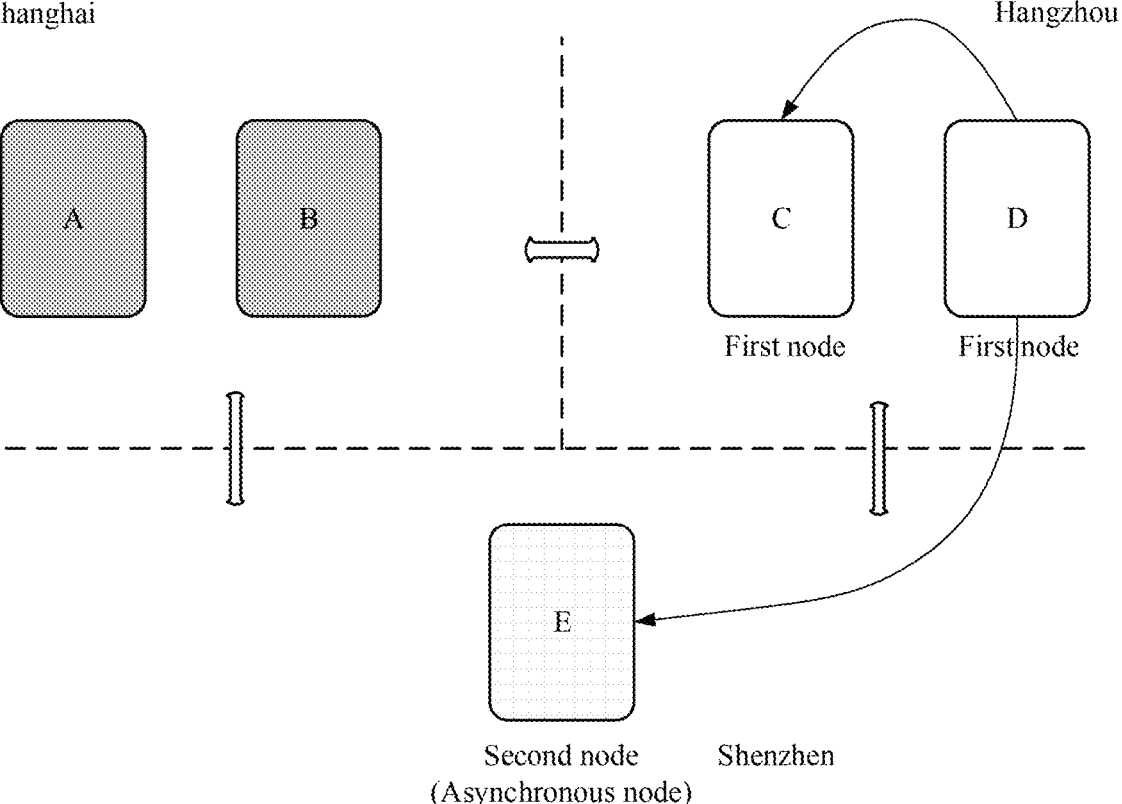

Shanghai                                                                                    Hangzhou

A        B                                    C              D

First node      First node

E

Second node          Shenzhen
(Asynchronous node)

FIG. 4

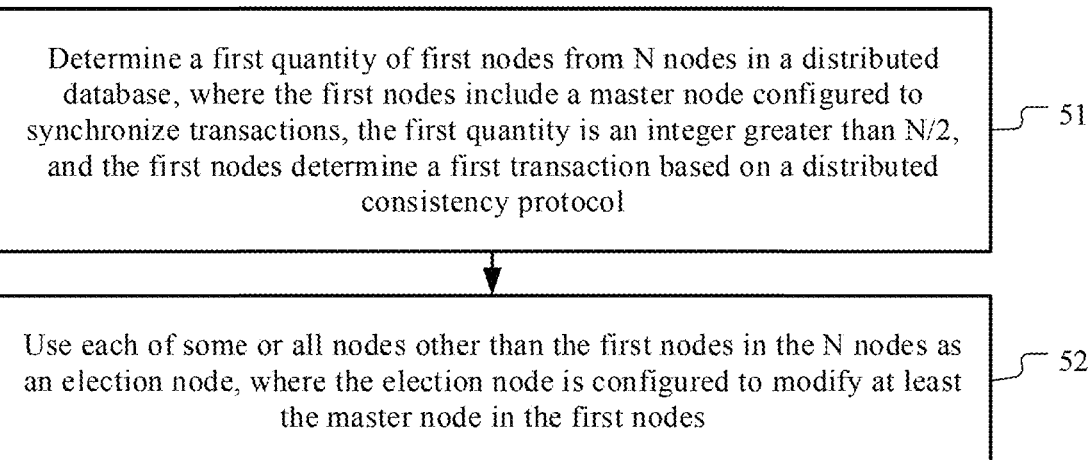

Determine a first quantity of first nodes from N nodes in a distributed database, where the first nodes include a master node configured to synchronize transactions, the first quantity is an integer greater than N/2, and the first nodes determine a first transaction based on a distributed consistency protocol ⌐ 51

Use each of some or all nodes other than the first nodes in the N nodes as an election node, where the election node is configured to modify at least the master node in the first nodes ⌐ 52

FIG. 5

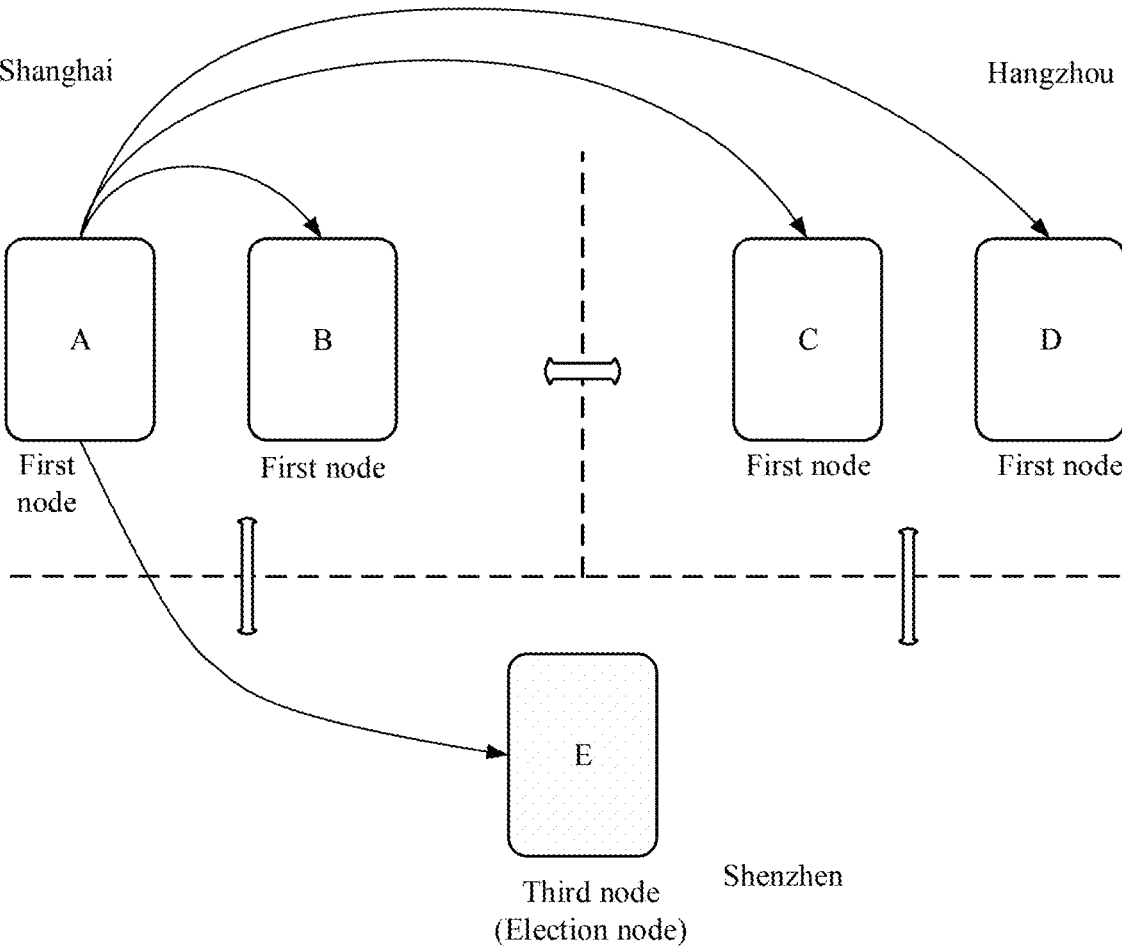

FIG. 6

Determine a first quantity of first nodes from N nodes in a distributed database, where the first nodes include a master node configured to synchronize transactions, the first quantity is an integer greater than N/2, and the first nodes determine a first transaction based on a distributed consistency protocol

~ 71

Use each of a first part of nodes other than the first nodes in the N nodes as an asynchronous node, and use each of a second part of nodes other than the first nodes as an election node, where the asynchronous node is configured to receive the first transaction from the master node in an asynchronous manner, and the election node is configured to modify at least the master node in the first nodes

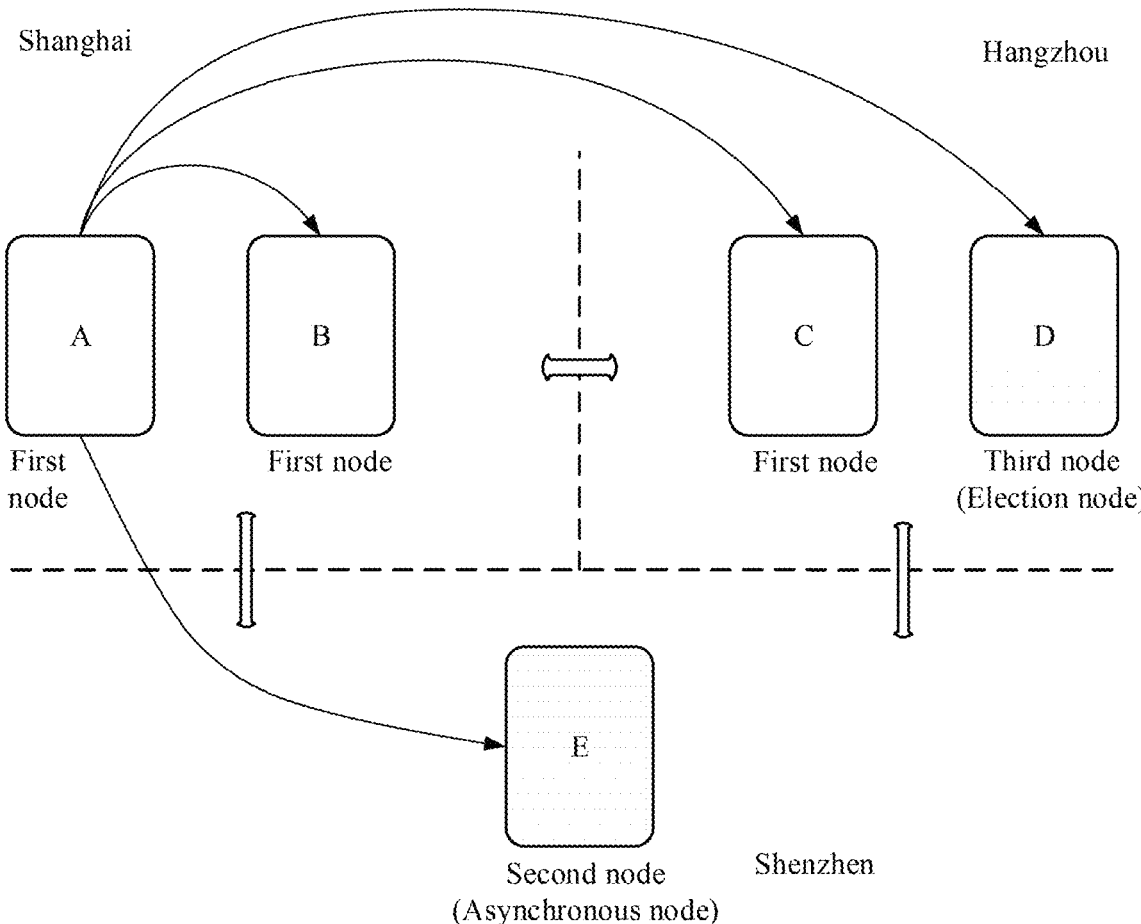

Shanghai

Hangzhou

A

B

C

D

First node

First node

First node

Third node
(Election node)

E

Second node
(Asynchronous node)

Shenzhen

FIG. 8

Determine a first quantity of first nodes from N nodes in a distributed database, where the first quantity is an integer greater than N/2, the first nodes include a master node configured to synchronize transactions, and the first nodes determine a transaction log for a first transaction based on a distributed consistency protocol  ⌐ 91

Use each of some or all nodes other than the first nodes in the N nodes as an asynchronous node or an election node, where the asynchronous node is configured to receive the transaction log from the master node in an asynchronous manner, and the election node is configured to modify at least the master node in the first nodes  ⌐ 92

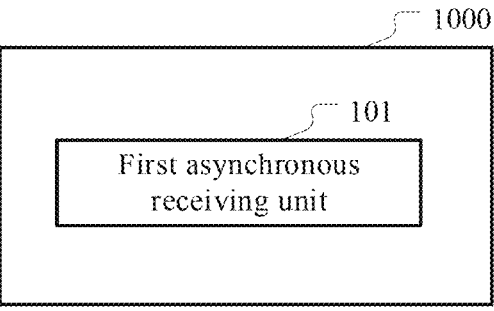

⌐ 101

First asynchronous receiving unit

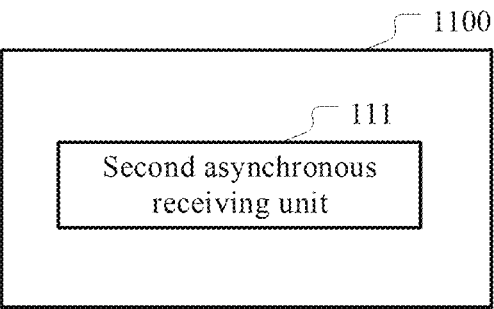

⌐ 111

Second asynchronous receiving unit

FIG. 11

METHODS FOR CONFIGURING NODES IN DISTRIBUTED DATABASE, METHODS FOR SYNCHRONIZING TRANSACTION LOGS IN THE DISTRIBUTED DATABASE, AND NODES IN DISTRIBUTED DATABASE

CROSS-REFERENCE TO RELATED APPLICATIONS

This application is a continuation of PCT Application No. PCT/CN2023/087009, filed on Apr. 7, 2023, which claims priority to Chinese Patent Application No. 202210724274.X, filed on Jun. 24, 2022, and each application is hereby incorporated by reference in its entirety.

TECHNICAL FIELD

One or more embodiments of this specification relate to the field of distributed databases, and in particular, to methods for configuring nodes in a distributed database, methods for synchronizing transaction logs in the distributed database, and the nodes in the distributed database.

BACKGROUND

A database is a very key technology in the digital era. A database system has excellent characteristics such as structured data storage, high shareability of stored data, low redundancy, easy scalability, and high independence, and currently, has been a necessarily used basic technology in many fields such as the financial field, the medical field, the education field, the scientific research field, and the electronic commerce field. However, with development of technologies, a data collection and application scale continuously increases, a conventional standalone relational database is less able to process increasing large-scale data. In view of this, a distributed database for processing the large-scale data emerges. The distributed database has good data scalability and the same SQL support and transaction semantic guarantee as the conventional database. Therefore, there is a trend to use a distributed transactional database in an application scenario in which better data scalability is needed. Currently, in a distributed database solution, data consistency between all nodes in a distributed database system is usually achieved based on a distributed consistency protocol. However, in this solution, there is a relatively high need for a network bandwidth between database nodes. When a network status is poor, efficiency of achieving data consistency between the nodes is significantly reduced.

SUMMARY

Embodiments of this specification are intended to provide methods for more efficiently achieving data consistency between nodes in a distributed system when a network status between database nodes is poor, to overcome disadvantages in the conventional technology.

According to a first aspect, a method for configuring nodes in a distributed database is provided, including: determining a first quantity of first nodes from N nodes in the distributed database, where the first nodes include a master node configured to synchronize transactions, the first quantity is an integer greater than N/2, and the first nodes determine a first transaction based on a distributed consistency protocol; and using each of some or all nodes other than the first nodes in the N nodes as an asynchronous node or an election node, where the asynchronous node is configured to receive the first transaction from the master node in an asynchronous manner, and the election node is configured to modify at least the master node in the first nodes.

In one or more possible implementations, the determining a first quantity of first nodes from N nodes in the distributed database includes: determining the first quantity of first nodes from the N nodes based on a network topology of the distributed database and/or a network bandwidth between the N nodes.

In one or more possible implementations, the N nodes are N valid nodes in the distributed database; and the election node is further configured to redetermine the valid node in the distributed database.

According to a first aspect, a method for synchronizing transaction logs in a distributed database is provided, including: determining a first quantity of first nodes from N nodes in the distributed database, where the first quantity is an integer greater than N/2, the first nodes include a master node configured to synchronize transactions, and the first nodes determine a transaction log for a first transaction based on a distributed consistency protocol; and using each of some or all nodes other than the first nodes in the N nodes as an asynchronous node or an election node, where the asynchronous node is configured to receive the transaction log from the master node in an asynchronous manner, and the election node is configured to modify at least the master node in the first nodes.

In one or more possible implementations, the determining a first quantity of first nodes from N nodes in the distributed database includes: determining the first quantity of first nodes from the N nodes based on a network topology of the distributed database and/or a network bandwidth between the N nodes.

In one or more possible implementations, the N nodes are N valid nodes in the distributed database; and the election node is further configured to redetermine the valid node in the distributed database.

According to a third aspect, a distributed database is provided. The distributed database includes N nodes, and the N nodes include: a first quantity of first nodes, where the first nodes include a master node configured to synchronize transactions, the first nodes determine a first transaction based on a distributed consistency protocol, and the first quantity is an integer greater than N/2; and an asynchronous node and/or an election node, where the asynchronous node is configured to receive the first transaction from the master node in an asynchronous manner, and the election node is configured to modify at least the master node in the first nodes.

In one or more possible implementations, the N nodes are N valid nodes in the distributed database; and the election node is further configured to redetermine the valid node in the distributed database.

According to a fourth aspect, a distributed database is provided. The distributed database includes N nodes, and the N nodes include: a first quantity of first nodes, where the first nodes include a master node configured to synchronize transactions, the first nodes determine a transaction log for a first transaction based on a distributed consistency protocol, and the first quantity is an integer greater than N/2; and an asynchronous node and/or an election node, where the asynchronous node is configured to receive the transaction log from the master node in an asynchronous manner, and the election node is configured to modify at least the master node in the first nodes.

In one or more possible implementations, the N nodes are N valid nodes in the distributed database; and the election node is further configured to redetermine the valid node in the distributed database.

According to a fifth aspect, an asynchronous node in a distributed database is provided. The distributed database further includes a first quantity of first nodes, the first nodes determine a first transaction based on a distributed consistency protocol, the first quantity is greater than N/2, N is a total quantity of valid nodes in the distributed database, and the asynchronous node includes: a first asynchronous receiving unit, configured to receive a first transaction from the master node in an asynchronous manner.

According to a sixth aspect, an asynchronous node in a distributed database is provided. The distributed database further includes a first quantity of first nodes, the first nodes determine a transaction log for a first transaction based on a distributed consistency protocol, the first quantity is greater than N/2, N is a total quantity of valid nodes in the distributed database, and the asynchronous node includes: a second asynchronous receiving unit, configured to receive the transaction log for the first transaction from the master node in an asynchronous manner.

According to a seventh aspect, an election node in a distributed database is provided. The distributed database further includes a first quantity of first nodes, the first nodes include a master node configured to synchronize transactions, the first nodes include the master node configured to synchronize the transactions, the first nodes determine a first transaction based on a distributed consistency protocol, the first quantity is greater than N/2, N is a total quantity of valid nodes in the distributed database, and the election node includes: a master node modification unit, configured to modify the master node in the first nodes.

In one or more possible implementations, the election node further includes: a valid node determining unit, configured to redetermine the valid node in the distributed database.

According to an eighth aspect, a computer-readable storage medium is provided. The computer-readable storage medium stores a computer program, and when the computer program is executed on a computer, the computer is enabled to perform the method in the first aspect, the second aspect, or the third aspect.

According to a ninth aspect, a computing device is provided, including a storage and a processor. The storage stores executable code, and when the processor executes the executable code, the method in the first aspect, the second aspect, or the third aspect is implemented.

Based on one or more of the method, the database, the node, the computing device, or the storage medium in the above-mentioned aspects, data consistency between nodes in the distributed system can be more effectively achieved when a network bandwidth between the database nodes is poor.

BRIEF DESCRIPTION OF DRAWINGS

To describe the technical solutions in the embodiments of this application more clearly, the following briefly describes the accompanying drawings needed for describing the embodiments. Clearly, the accompanying drawings in the following descriptions show merely some embodiments of this application, and a person of ordinary skill in the art can still derive other drawings from these accompanying drawings without creative efforts.

FIG. 3 is a flowchart illustrating a method for configuring nodes in a distributed database, according to one or more embodiments of this specification;

FIG. 4 is a schematic diagram illustrating a method for configuring nodes in a distributed database, according to one or more other embodiments of this specification;

FIG. 5 is a flowchart illustrating a method for configuring nodes in a distributed database, according to one or more still other embodiments of this specification;

FIG. 6 is a schematic diagram illustrating a method for configuring nodes in a distributed database, according to one or more still other embodiments of this specification;

FIG. 7 is a flowchart illustrating a method for configuring nodes in a distributed database, according to one or more yet other embodiments of this specification;

FIG. 8 is a schematic diagram illustrating a method for configuring nodes in a distributed database, according to one or more yet other embodiments of this specification;

FIG. 9 is a flowchart illustrating a method for synchronizing transaction logs in a distributed database, according to one or more embodiments of this specification;

FIG. 10 is a structural diagram illustrating a database node, according to one or more embodiments of this specification;

FIG. 11 is a structural diagram illustrating another database node, according to one or more embodiments of this specification.

DESCRIPTION OF EMBODIMENTS

The following describes the solutions provided in this specification with reference to the accompanying drawings.

As described above, in a current distributed database solution, data consistency between nodes in a distributed system is usually achieved based on a distributed consistency protocol. However, in this solution, there is a relatively high need for a network bandwidth between database nodes. When a network status is poor, efficiency of achieving data consistency between the nodes is significantly reduced. To more clearly describe the technical effect of a node configuration solution for a distributed database provided in the embodiments of this specification, the following further provides brief descriptions of a common technical solutions for achieving data consistency between existing database nodes.

Figure 1:
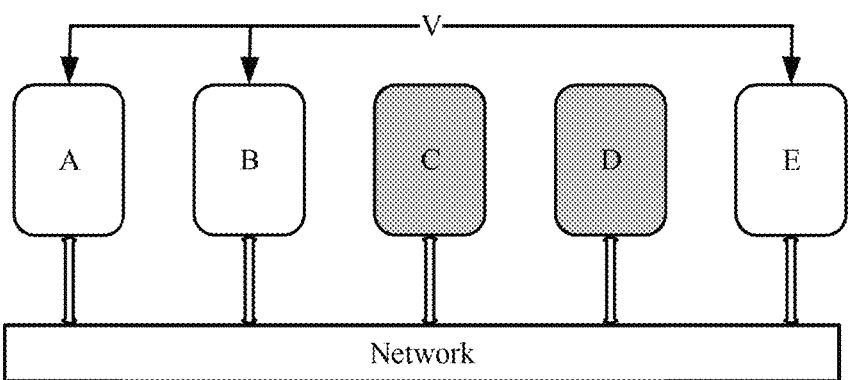
FIG. 1 is a schematic diagram illustrating a method for achieving data consistency between database nodes in a distributed database.

FIG. 1 is a schematic diagram illustrating a method for achieving data consistency between database nodes in a distributed database. As shown in FIG. 1, for example, a node A, a node B, a node C, a node D, and a node E are five nodes in the distributed database. The node A, the node B, the node C, the node D, and the node E can determine a unique value of data (for example, V) in the distributed database based on a distributed consistency protocol. Usually, data consistency can be achieved based on the distributed consistency protocol when a majority of nodes (greater than ½ of a total quantity of nodes) in a system can work. For example, as shown in FIG. 1, data consistency can be achieved when any two of the nodes A, B, C, D, and E break down. For example, when the nodes C and D break down, the unique V value can be actually determined through the nodes A, B, and C. However, a problem with the above-mentioned solution is that, in a process of achieving data consistency based on the distributed consistency protocol, the nodes usually need to send or receive a large amount of consistency consensus information (for example, a consensus request for data on which a consensus is to be reached or a response to the consensus request). If a network connection status between some of the nodes A, B, C, D, and E is poor, a network bandwidth between the nodes is reduced or has low stability, and a speed at which the nodes obtain the consensus information from the nodes whose network connection status is poor is greatly reduced. Consequently, a speed of a consensus mechanism of the entire distributed database is greatly reduced. The following further describes the above-mentioned problems by using a specific example. In the distributed database, an operating unit that processes data is usually a transaction. Therefore, determining data in the distributed database can usually be equivalent to determining a transaction of writing the data. Specifically, in one or more embodiments, for example, the transaction can be determined by determining a transaction log corresponding to the transaction of writing the data.

However, each node in the distributed database can determine a transaction log of each to-be-determined transaction in the data based on the distributed consistency protocol. In an example, for example, a series of log values V1, V2, . . . , Vx, . . . , Vn can be determined. Each value can represent content of a specific transaction log. In a process of determining a transaction log, one of the nodes can usually be used as a master node. A user writes data of the transaction to the master node, to generate a transaction log, and then, the master node sends the transaction log to all other slave nodes through a network, and waits and determines, based on a consensus feedback of all the other slave nodes, whether the transaction log is executed (in other words, determines whether to execute the transaction). However, when a quantity of transactions occurring in the same time period is very large or an amount of data written to a transaction is large, a very large network bandwidth needs to be consumed for transmission of the transaction log. However, network bandwidths between different nodes are usually different. For example, a bandwidth between nodes that are geographically distributed relatively close (for example, in the same city or adjacent cities) is usually relatively high, and a bandwidth between nodes that are geographically distributed relatively far is usually relatively low. In an existing distributed database solution, in a transaction consensus process, all nodes are treated equally. To be specific, the master node sends, to each slave node, a transaction log on which a consensus needs to be reached, and then waits for a response returned by each slave node. In this way, because some slave nodes that are relatively far from the master node do not have an enough bandwidth with the master node, when traffic of the transaction is large, a transaction log transmission and response speed between the slave nodes and the master node is reduced. Consequently, data consensus efficiency of the entire database is reduced, and a bottleneck in a data processing capability of the entire database system occurs.

To resolve a problem existing in the above-mentioned technical solutions, the inventor proposes a method for achieving data consistency between database nodes in a distributed database in the embodiments of this specification. A core idea of the method is that the database nodes can include a common node (or referred to as a first node) and an asynchronous node (or referred to as a second node) based on a network bandwidth status between the nodes. The common node (or referred to as the first node) is configured to determine transaction data based on a distributed consistency protocol, and the asynchronous node (or referred to as the second node) is configured to obtain the transaction data from the common node in an asynchronous manner after the transaction data are determined. Therefore, only a common node with a relatively good bandwidth status can usually determine the transaction data, and then the common node sends the determined transaction data to the asynchronous node in an asynchronous manner. Asynchronous data sending can be avoided, for example, in a service peak period, to avoid a reduction in overall data consensus efficiency in the distributed database due to a poor bandwidth status of some nodes in the service peak period.

Figure 2:
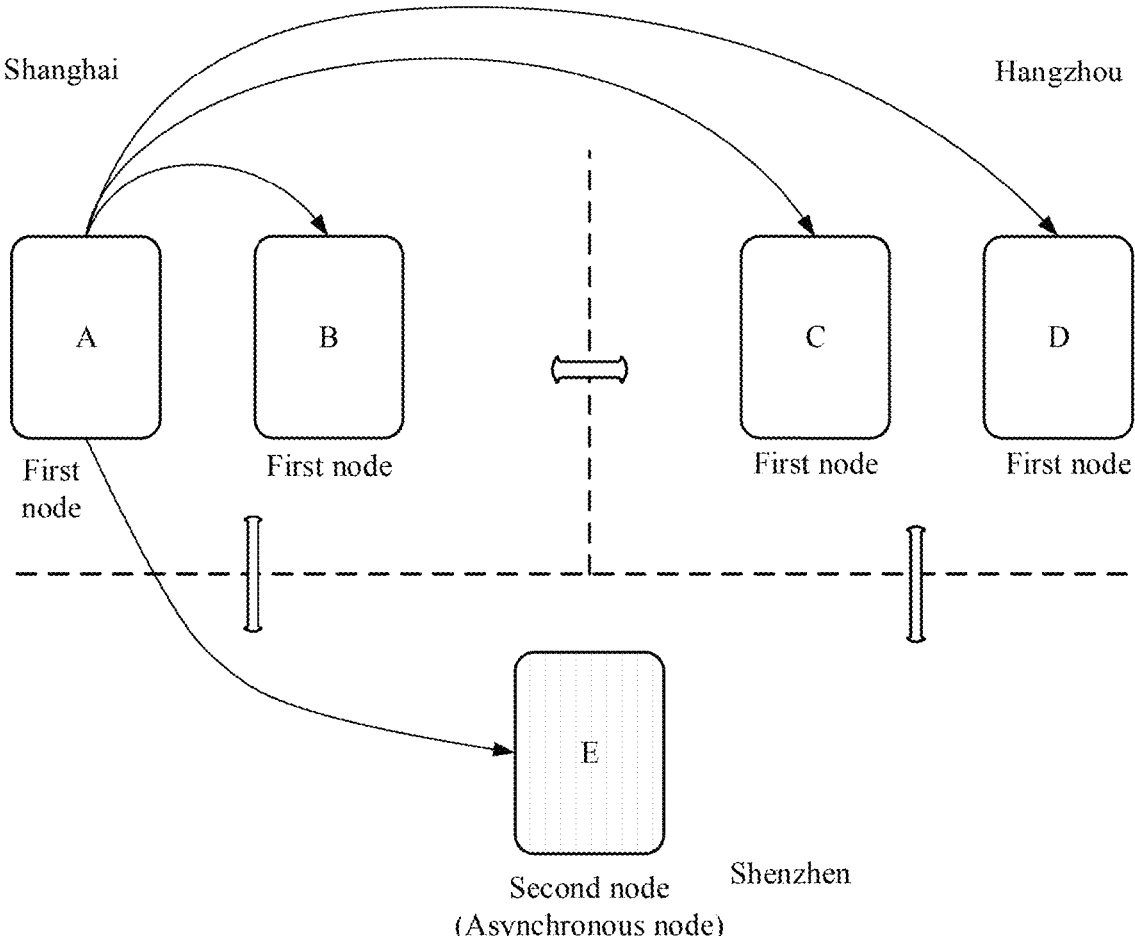
FIG. 2 is a schematic diagram illustrating a method for configuring nodes in a distributed database, according to one or more embodiments of this specification.

FIG. 2 is a schematic diagram illustrating a method for achieving data consistency between database nodes in a distributed database. As shown in FIG. 2, the distributed database has five nodes, and the five nodes are nodes A, B, C, D, and E. A and B are, for example, placed in Shanghai; C and D are, for example, placed in Hangzhou; and E is placed in Shenzhen. It is assumed that a network bandwidth between Shanghai and Hangzhou is relatively large, and a network bandwidth between Shenzhen and each of Shanghai and Hangzhou is relatively small. If the node A is a master node, a transaction starts writing from the node A, and then A synchronizes a transaction log to another node. As described above, because an entire data consistency need of the database can be satisfied usually by simply synchronizing the transaction log to most nodes (namely, more than a half of nodes, and three or more nodes) based on the distributed consistency protocol, the data consistency need can be satisfied by simply sending, by the node A, the transaction log to the nodes in Shanghai and Hangzhou, and then determining the transaction log based on a feedback of the nodes. The node E in Shenzhen can be used as an asynchronous node. To be specific, the node E does not need to participate in determining of the transaction log. Therefore, after determining the transaction log, the node A can send the transaction log to the node E in an asynchronous manner. A specific sending time after the transaction log is determined can be determined based on a preset time rule or a network status determining condition. For example, transaction data do not need to be sent to the node E in a service peak period or when transaction log traffic is lower than a predetermined threshold. Therefore, a transaction processing speed or a transaction throughput of an entire database system is not affected.

The following further describes a specific process of the method.

FIG. 3 is a flowchart illustrating a method for configuring nodes in a distributed database, according to one or more embodiments of this specification. As shown in FIG. 3, the method includes at least the following steps.

Step 31: Determine a first quantity of first nodes from N nodes in the distributed database, where the first quantity is an integer greater than N/2, and the first nodes determine a first transaction based on a distributed consistency protocol.

The distributed database is usually a database that has a distributed transaction processing capability, can be smoothly scaled, and is distributed in a computer network and is logically unified. Data stored in the distributed database can be physically stored on each of different database nodes. A transaction is a set of data operations for accessing or operating a data item in a database, and for the set of data operations, either all data operations in the set are performed, or none of the data operation in the set is performed. Usually, for a distributed transaction database, all data operations are encapsulated into a transaction for processing, or all data access is performed by submitting a transaction. In different embodiments, the distributed database can be distributed databases of different specific types. This is not limited in this specification. In different embodiments, the node in the distributed database can be one or more storage nodes in a physical node, a virtual machine node, or a container node.

As described above, in this step, the determined first nodes can determine a database transaction based on the distributed consistency protocol. In different embodiments, the first nodes can be determined from the nodes in the distributed database in different specific manners. This is not limited in this specification. In one or more embodiments, the first quantity of first nodes can be determined from the N nodes based on a network topology of the distributed database and/or a network bandwidth between the N nodes. In different embodiments, the first nodes can alternatively determine the database transaction in different specific manners. For example, in one or more embodiments, the first nodes can determine a transaction log for the first transaction based on the distributed consistency protocol. Further, all the first nodes can determine a to-be-executed first transaction based on the determined transaction log.

Step 32: Use each of some or all nodes other than the first nodes in the N nodes as an asynchronous node.

In this step, an asynchronous node (namely, the second node in FIG. 3) is configured to be used by the first nodes to send the first transaction to the asynchronous node in an asynchronous manner. The asynchronous manner here means that the second node does not participate in a consensus process of the first transaction, and can obtain the first transaction from the first nodes after the first transaction is determined in the consensus process. In different embodiments, the asynchronous node can be determined from the nodes other than the first nodes in different specific manners. This is not limited in this specification. For example, the asynchronous node can be determined from the nodes other than the first nodes based on a network bandwidth between each first nodes and the nodes other than the first nodes. In different embodiments, after the first transaction is determined, a specific time of sending the first transaction to the second node can also be determined in different specific manners. In one or more embodiments, the specific time can be determined based on a preset time rule or a network status determining condition.

In the above-mentioned embodiments of determining the transaction based on the transaction log, at least one first node can send the transaction log to the asynchronous node in an asynchronous manner.

In one or more implementations, some database nodes are unavailable currently (usually, a quantity cannot be more than ½ of a total quantity of nodes). To further accelerate transaction consensus efficiency of a system, a current available node can redetermine a member node in the database system, exclude at least a current unavailable node from the member node in the database system, and determine the first nodes and the asynchronous nodes based on the new member nodes. FIG. 4 is a schematic diagram illustrating a method for configuring nodes in a distributed database, according to one or more other embodiments of this specification. As shown in FIG. 4, when both the nodes A and B in Shanghai are unavailable, the nodes C, D, and E can modify the member node in the database (or referred to as a valid node, namely, a node that can effectively operate in a current database), modify a quantity of member nodes from 5 to 3 (that is, N changes from 5 to 3), and select one of the nodes as a master node. In this case, a quantity of transaction logs is also reduced from 5 to 3. The nodes C, D, and E need to reach an agreement on both electing the master node and modifying the member node. Then, no more than N/2 asynchronous nodes (it is worthwhile to note that N is 3) can be determined in C, D, and E. As shown in FIG. 4, for example, the node D is a master node, and the node E is an asynchronous node.

In some application scenarios, a bandwidth condition of some database nodes is very low. To further reduce a response of the nodes to database transaction consensus efficiency, the nodes can be set as election nodes, and the election node does not need to participate in a transaction determining process or receive a transaction from another node after the transaction is determined. The election node only needs to participate in determining the first nodes and, for example, participate in determining a modification of a member node in a database or participate in electing a master node. Therefore, the election node only needs to receive or send information related to the modification of the member node in the database or election of the master node (for example, prepare information in a paxos protocol). Therefore, a data amount sent or received by the election node is very small, to greatly reduce a network bandwidth consumed by the data amount. FIG. 5 is a flowchart illustrating a method for configuring nodes in a distributed database, according to one or more still other embodiments of this specification. As shown in FIG. 5, the method includes at least the following steps.

Step 51: Determine a first quantity of first nodes from N nodes in the distributed database, where the first nodes include a master node configured to synchronize transactions, the first quantity is an integer greater than N/2, and the first nodes determine a first transaction based on a distributed consistency protocol.

As described above, in this step, the determined first nodes can determine a database transaction based on a distributed consistency protocol, and the first nodes include the master node configured to synchronize the transactions. In different embodiments, the first nodes can be determined from the nodes in the distributed database in different specific manners. This is not limited in this specification. In one or more embodiments, the first quantity of first nodes can be determined from the N nodes based on a network topology of the distributed database and/or a network bandwidth between the N nodes.

Step 52: Use each of some or all nodes other than the first nodes in the N nodes as an election node.

As described above, the first nodes can include the master node. In this step, the election node can be configured to modify the master node in the database, namely, redetermine the master node in the first nodes. In one or more embodiments, the election node can be further configured to determine a modification of a member node in the database, namely, redetermine a valid node (or referred to as a member node) in the database. FIG. 6 is a schematic diagram illustrating a method for configuring nodes in a distributed database, according to one or more still other embodiments of this specification. As shown in FIG. 6, for example, when a network bandwidth of a node E in Shenzhen is lower than a preset bandwidth condition, the node E can be set as an election node. To be specific, the node E does not need to participate in determining a transaction log in the database does not need to receive a database transaction log, and only needs to participate in determining the modify of the member node in the database or the master node. The election node is set, to not only save a network bandwidth, but also further save another system resource of the node, for example, a CPU, memory, and a disk. Therefore, in one or more embodiments, the election node can be determined based on a network bandwidth between each first node and the nodes other than the first nodes. In one or more other embodiments, the election node can alternatively be determined based on a computing resource of the nodes other than the first nodes. In one or more embodiments, the election node can alternatively be determined with reference to a network bandwidth and a computing resource of the nodes other than the first nodes.

FIG. 7 is a flowchart illustrating a method for configuring nodes in a distributed database, according to one or more yet other embodiments of this specification. As shown in FIG. 7, the method includes at least the following steps.

Step 71: Determine a first quantity of first nodes from N nodes in the distributed database, where the first nodes include a master node configured to synchronize transactions, the first quantity is an integer greater than N/2, and the first nodes determine a first transaction based on a distributed consistency protocol.

An operation of this step is similar to that of step 51. For detailed descriptions of this step, references can be made to the descriptions of step 51. Details are omitted here for simplicity.

Step 72: Use each of a first part of nodes other than the first nodes in the N nodes as an asynchronous node, and use each of a second part of nodes other than the first nodes as an election node, where the asynchronous node is configured to receive the first transaction from the master node in an asynchronous manner, and the election node is configured to modify at least the master node in the first nodes.

A manner of determining the asynchronous node and the selection node in this step is similar to a manner of determining the asynchronous node and the selection node in step 32 and step 52. For detailed descriptions of the manner, references can be made to descriptions of step 32 and step 52. Details are omitted here for simplicity. In one or more embodiments, the N nodes can be N valid nodes in the distributed database. The third node can be further configured to redetermine the valid node in the distributed database.

FIG. 8 is a schematic diagram illustrating a method for configuring nodes in a distributed database, according to one or more yet other embodiments of this specification. As shown in FIG. 8, in a distributed database system, an asynchronous node and an election node can be set, and a total quantity of asynchronous nodes and election nodes is limited to be less than ½ of a total number of nodes (namely, less than N/2). Within this limitation range, in different embodiments, a ratio of asynchronous nodes to election nodes can be different. This is not limited in this specification. For example, as shown in FIG. 8, any two of a node A, a node B, a node C, a node D, and a node E can be set as asynchronous nodes, election nodes, or a combination of the asynchronous node and the election node.

FIG. 9 is a flowchart illustrating a method for synchronizing transaction logs in a distributed database, according to one or more embodiments of this specification. As shown in FIG. 9, the method includes at least the following steps.

Step 91: Determine a first quantity of first nodes from N nodes in the distributed database, where the first quantity is an integer greater than N/2, the first nodes include a master node configured to synchronize transactions, and the first nodes determine a transaction log for a first transaction based on a distributed consistency protocol.

Step 92: Use each of a first part of nodes other than the first nodes in the N nodes as an asynchronous node, and use each of a second part of nodes other than the first nodes as an election node, where the asynchronous node is configured to receive the first transaction from the master node in an asynchronous manner, and the election node is configured to modify at least the master node in the first nodes.

In one or more embodiments, the first quantity of first nodes can be determined from the N nodes based on a network topology of the distributed database and/or a network bandwidth between the N nodes.

In one or more embodiments, the N nodes are N valid nodes in the distributed database, and the election node can be further configured to redetermine the valid node in the distributed database.

According to the method for configuring nodes in a distributed database and the method for synchronizing transaction logs in the distributed database provided in the embodiments of this specification, there are the following advantages: The asynchronous node and/or the election node are/is set in the distributed database. The asynchronous node does not participate in determining a transaction, and only receives transaction data in an asynchronous manner after the transaction is determined. The election node does not participate in determining the transaction, does not receive the transaction data, and only participates in a modification of a member node in the database, determining a transaction synchronization node, or electing the master node, to reduce network resources consumed for transaction synchronization in the distributed database. In this way, when the network bandwidth is insufficient, the distributed database can still perform transaction processing based on a distributed data consistency protocol, and ensure a transaction processing speed of the distributed database.

According to another part of the embodiments, a distributed database is further provided. The distributed database includes N nodes, and the N nodes include: a first quantity of first nodes, where the first nodes include a master node configured to synchronize transactions, the first nodes determine a first transaction based on a distributed consistency protocol, and the first quantity is an integer greater than N/2; and an asynchronous node and/or an election node, where the asynchronous node is configured to receive the first transaction from the master node in an asynchronous manner, and the election node is configured to modify at least the master node in the first nodes.

In one or more embodiments, the N nodes can be N valid nodes in the distributed database. The election node can be further configured to redetermine the valid node in the distributed database.

According to still another part of the embodiments, another distributed database is further provided. The distributed database includes N nodes, and the N nodes include: a first quantity of first nodes, where the first nodes include a master node configured to synchronize transactions, the first nodes determine a transaction log for a first transaction based on a distributed consistency protocol, and the first quantity is an integer greater than N/2; and an asynchronous node and/or an election node, where the asynchronous node is configured to receive the transaction log from the master node in an asynchronous manner, and the election node is configured to modify at least the master node in the first nodes.

In one or more embodiments, the N nodes can be N valid nodes in the distributed database. The election node can be further configured to redetermine the valid node in the distributed database.

According to another part of the embodiments, an asynchronous node in a distributed database is further provided. The distributed database further includes a first quantity of first nodes, the first nodes determine a first transaction based on a distributed consistency protocol, the first quantity is greater than N/2, and N is a total quantity of valid nodes in the distributed database. FIG. 10 is a structural diagram illustrating a database node, according to one or more embodiments of this specification. As shown in FIG. 10, the asynchronous node 1000 includes: a first asynchronous receiving unit 101, configured to receive a first transaction from the master node in an asynchronous manner.

According to still another part of the embodiments, another asynchronous node in a distributed database is further provided. The distributed database further includes a first quantity of first nodes, the first nodes determine a transaction log for a first transaction based on a distributed consistency protocol, the first quantity is greater than N/2, and N is a total quantity of valid nodes in the distributed database. FIG. 11 is a structural diagram illustrating another database node, according to one or more embodiments of this specification. As shown in FIG. 11, the asynchronous node 1100 includes: a second asynchronous receiving unit 111, configured to receive the transaction log for the first transaction from the master node in an asynchronous manner.

Figure 12:
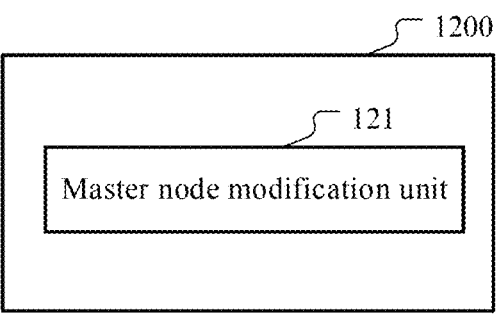
FIG. 12 is a structural diagram illustrating still another database node, according to one or more embodiments of this specification.

According to another part of the embodiments, an election node in a distributed database is further provided. The distributed database further includes a first quantity of first nodes, the first nodes include a master node configured to synchronize transactions, the first nodes determine a first transaction based on a distributed consistency protocol, the first quantity is greater than N/2, and N is a total quantity of valid nodes in the distributed database. FIG. 12 is a structural diagram illustrating still another database node, according to one or more embodiments of this specification. As shown in FIG. 12, the election node 1200 includes: a master node modification unit 121, configured to modify the master node in the first nodes.

In one or more embodiments, the election node can further include: a valid node determining unit, configured to redetermine the valid node in the distributed database.

Another aspect of this specification provides a computer-readable storage medium. The computer-readable storage medium stores a computer program, and when the computer program is executed in a computer, the computer is enabled to perform any one of the above-mentioned methods.

Another aspect of this specification provides a computing device, including a storage and a processor. The storage stores executable code, and when the processor executes the executable code, any one of the above-mentioned methods is implemented.

It should be understood that descriptions such as "first" and "second" in this specification are merely intended to distinguish a similar concept for simplicity of descriptions, and do not have another limitation function.

A person skilled in the art should be aware that, in the above-mentioned one or more examples, functions described in this application can be implemented by hardware, software, firmware, or any combination thereof. When the functions are implemented by software, the above-mentioned functions can be stored in a computer-readable medium or transmitted as one or more instructions or code in the computer-readable medium.

In the above-mentioned specific implementations, the objectives, technical solutions, and beneficial effects of this application are further described in detail. It should be understood that the above-mentioned descriptions are merely specific implementations of this application, but are not intended to limit the protection scope of this application. Any modification, equivalent replacement, improvement, etc. made based on the technical solutions of this application shall fall within the protection scope of this application.

The invention claimed is:

1. A computer-implemented method for configuring nodes in a distributed database, comprising:
    determining a first quantity of first nodes from N nodes in the distributed database, wherein N is a positive integer, wherein the first nodes comprise a master node configured to synchronize transactions, the first quantity is an integer greater than N/2, and the first nodes determine a first transaction based on a distributed consistency protocol; and
    determining one or more of remaining nodes other than the first nodes in the N nodes as election nodes, wherein the election nodes are configured to determine the master node without receiving the first transaction from the master node.

2. The computer-implemented method according to claim 1, wherein the determining a first quantity of first nodes from N nodes in the distributed database comprises:
    determining the first quantity of first nodes from the N nodes based on a network bandwidth between the N nodes.

3. The computer-implemented method according to claim 2, wherein determining the first quantity of first nodes from the N nodes based on the network bandwidth between the N nodes comprises:
    determining that a first pairwise network bandwidth between a first particular node and each of one or more of the N nodes in the distributed database is above a network bandwidth threshold; and
    in response to determining that the first pairwise network bandwidth is above the network bandwidth threshold, determining the first particular node as a first node.

4. The computer-implemented method according to claim 3, further comprising:
    determining that a second pairwise network bandwidth between a second particular node and each of one or more of the N nodes in the distributed database is below the network bandwidth threshold; and
    in response to determining that the second pairwise network bandwidth is below the network bandwidth threshold, determining the second particular node as an asynchronous node that is configured to receive the first transaction from the master node after the first transaction is determined by the first nodes.

5. The computer-implemented method according to claim 1, wherein the N nodes are N valid nodes in the distributed database, and wherein the election nodes are configured to determine the N valid nodes in the distributed database.

6. The computer-implemented method according to claim 1, wherein the determining a first quantity of first nodes from N nodes in the distributed database comprises:
    determining the first quantity of first nodes from the N nodes based on a network topology of the distributed database.

7. The computer-implemented method according to claim 1, wherein determining one or more of the remaining nodes as the election nodes comprises:

determining one or more of the remaining nodes as the election nodes based on a computing resource of each of one or more of the remaining nodes.

8. The computer-implemented method according to claim 7, wherein the computing resource of each of one or more of the remaining nodes comprises: a CPU, memory, or a disk of each of one or more of the remaining nodes.

9. The computer-implemented method according to claim 1, wherein determining one or more of the remaining nodes as the election nodes comprises:

determining one or more of the remaining nodes as the election nodes based on a geographic distance between each of one or more of the remaining nodes and each first node.

10. A distributed database, wherein the distributed database comprises N nodes, and the N nodes comprise:

a first quantity of first nodes, wherein the first nodes comprise a master node configured to synchronize transactions, the first nodes determine a first transaction based on a distributed consistency protocol, and the first quantity is an integer greater than N/2, where N is a positive integer; and an election node configured to determine the master node in the first nodes without receiving the first transaction from the master node.

11. The distributed database according to claim 10, wherein the N nodes are N valid nodes in the distributed database; and the election node is configured to redetermine the N valid nodes in the distributed database.

12. A non-transitory, computer-readable medium storing one or more instructions executable by a computer system to perform operations for configuring nodes in a distributed database, the operations comprising:

determining a first quantity of first nodes from N nodes in the distributed database, wherein N is a positive integer, wherein the first nodes comprise a master node configured to synchronize transactions, the first quantity is an integer greater than N/2, and the first nodes determine a first transaction based on a distributed consistency protocol; and determining one or more of remaining nodes other than the first nodes in the N nodes as election nodes, wherein the election nodes are configured to determine the master node without receiving the first transaction from the master node.

13. The non-transitory, computer-readable medium according to claim 12, wherein the determining a first quantity of first nodes from N nodes in the distributed database comprises:

determining the first quantity of first nodes from the N nodes based on a network bandwidth between the N nodes.

14. The non-transitory, computer-readable medium according to claim 13, wherein determining the first quantity of first nodes from the N nodes based on the network bandwidth between the N nodes comprises:

determining that a first pairwise network bandwidth between a first particular node and each of one or more of the N nodes in the distributed database is above a network bandwidth threshold; and in response to determining that the first pairwise network bandwidth is above the network bandwidth threshold, determining the first particular node as a first node.

15. The non-transitory, computer-readable medium according to claim 14, wherein the operations further comprise:

determining that a second pairwise network bandwidth between a second particular node and each of one or more of the N nodes in the distributed database is below the network bandwidth threshold; and in response to determining that the second pairwise network bandwidth is below the network bandwidth threshold, determining the second particular node as an asynchronous node that is configured to receive the first transaction from the master node after the first transaction is determined by the first nodes.

16. The non-transitory, computer-readable medium according to claim 12, wherein the N nodes are N valid nodes in the distributed database, and wherein the election nodes are configured to determine the N valid nodes in the distributed database.

17. The non-transitory, computer-readable medium according to claim 12, wherein the determining a first quantity of first nodes from N nodes in the distributed database comprises:

determining the first quantity of first nodes from the N nodes based on a network topology of the distributed database.

18. The non-transitory, computer-readable medium according to claim 12, wherein determining one or more of the remaining nodes as the election nodes comprises:

determining one or more of the remaining nodes as the election nodes based on a computing resource of each of one or more of the remaining nodes.

19. The non-transitory, computer-readable medium according to claim 18, wherein the computing resource of each of one or more of the remaining nodes comprises: a CPU, memory, or a disk of each of one or more of the remaining nodes.

20. The non-transitory, computer-readable medium according to claim 12, wherein determining one or more of the remaining nodes as the election nodes comprises:

determining one or more of the remaining nodes as the election nodes based on a geographic distance between each of one or more of the remaining nodes and each first node.

* * * * *